United States Patent [19]
Hilker

[11] 4,394,417
[45] Jul. 19, 1983

[54] MAGNET WIRE

[75] Inventor: George D. Hilker, Fort Wayne, Ind.

[73] Assignee: Phelps Dodge Industries, Inc., New York, N.Y.

[21] Appl. No.: 255,473

[22] Filed: Apr. 20, 1981

Related U.S. Application Data

[63] Continuation-in-part of Ser. No. 931,314, Aug. 7, 1978.

[51] Int. Cl.³ .............................................. B32B 27/00

[52] U.S. Cl. .................................... 428/383; 428/379; 428/380; 428/401; 428/412; 428/418; 428/419; 428/458; 428/473.5; 428/475.2; 428/480; 428/524; 428/525; 428/477.7

[58] Field of Search ................ 427/117, 118; 428/383, 428/379, 380, 401, 412, 418, 419, 458, 473.5, 474.7, 475.2, 480, 524, 525

[56] References Cited

U.S. PATENT DOCUMENTS

| | | | |
|---|---|---|---|
| 3,856,566 | 12/1974 | Saunders | 427/117 |
| 4,130,676 | 12/1978 | Ichiyanagi et al. | 427/117 |
| 4,145,474 | 3/1979 | Kertscher et al. | 427/117 X |

*Primary Examiner*—Bernard D. Pianalto
*Attorney, Agent, or Firm*—David A. Lundy

[57] ABSTRACT

A novel magnet wire or other coated filament comprising an elongated filament with a surprisingly concentric and continuous coating superimposed thereupon. The coating may be applied to the desired thickness in a single pass.

7 Claims, 4 Drawing Figures

MAGNET WIRE

RELATED APPLICATIONS

This is a continuation-in-part application of U.S. Pat. application Ser. No. 931,314 entitled "METHOD AND APPARATUS FOR MANUFACTURING MAGNET WIRE AND A MAGNET WIRE MADE THEREBY" filed on Aug. 7, 1978 and related to United States Patent Application entitled "METHOD FOR MANUFACTURING MAGNET WIRE AND A MAGNET WIRE MADE THEREBY" filed herewith, also a continuation-in-part of U.S. Pat. application Ser. No. 931,314.

BACKGROUND OF THE INVENTION

The invention relates to magnet wire and more particularly to a magnet wire having a surprisingly concentric and continuous coating superimposed thereon.

Magnet wire has been conventionally manufactured by passing a bare copper or aluminum conductor or a previously insulated copper or aluminum conductor through a bath of liquid enamel (a solution of resin material in a solvent thereof) and through an over for driving off the solvent from the enamel and/or curing the resin, leaving a resin coat on the conductor.

The application of several coats of material to a filament from solution accounts for all of the magnet wire manufactured today. While some materials using today's technology can only be applied from solution, the cost of the solvent expended in applying resin materials from solution is usually significant. The machinery used in this process is also highly complex and expensive, although the machinery cost is usually not a factor since most of such machinery has been in use for a considerable number of years. Still, the original cost of such machinery is significant for new installations. In addition to the cost machinery and the solvent expended by such a process, there is the cost of providing and maintaining pllution control equipment; since recently both Federal and State laws have required that the oven stack gases of such machines by essentially stripped of solvent before exhausting the gases to the atmosphere. While various methods of burning the vaporized solvent and/or reclaimng the solvent have been proposed, all such methods result in further expense to the manufacturer.

Additionally, the application of a layer of material to a filament from solution usually requires several successive coats in order to result in a concentric coat of a desired thickness. For example, six coats may be required for a 3 mil coating, although in specific applications as many as 24 coats have been required. Also, multiple coats of certain materials, such as polyethylene terephthalate (PET) cannot be applied successfully from solution due to a lack of good adhesion and wetting between coats.

It therefore has been desirable for some time to provide an improved magnet wire which can be manufactured without the use of solvent. Also, it would be additionally highly desirable to provide an improved magnet wire which could be manufactured utilizing an apparatus of simple design. Also, it would be highly desirable to provide magnet wire manufactured by a process which would allow the wire to be drawn, coated and spooled in a continuous operation; conventinally the wire is drawn, annealed if necessary, spooled; and then coated and spooled again for shipment. Also, it would be highly desirable to provide a magnet wire which can successfully be manufactured by application of multiple layers of materials such as polyethylene terephthalate (PET), which has heretofore not been possible. Additionally, it would be highly desirable to provide a magnet wire having a coating thereon of improved continuity and concentricity. Finally, it would be highly desirable to provide an improved magnet wire, the manufacture of which would not require the use of solvent or pollution control apparatus, or be limited to materials requiring an oven cure, or require multiple coats to obtain a coating of the required continuity and concentricity.

Applying coatings of resinous material by extrusion is substantially less common that applying coatings from solution, since conventional extrusion processes are extremely limited. Coatings of 4 mils and less are either extremely difficult to apply or impossible to apply by conventional extrusion processes. Also, the number of materials which are normally applied by conventional extrusion processes are extremely limited. Polyvinylchloride, polyethylene, polypropylene and various elastomeric rubbers comprise 99% of the materials applied by extrusion. These materials are not used in a true magnet wire application, i.e. an electrical winding, the turns of which are insulated to provide low voltage, mechanical, and thermal protection between turns, and do not possess magnet wire properties. In contrast, these materials are conventionally used in lead wire or hook-up wire applications which must protect against the full imput line voltage of an electrical device. Conventinally, extrusion is used in the production of only cables, building wire, and lead or hook-up wire.

While the apparatus used in conventional extrusion processes is relatively simple when compared to a conventional wire coating tower, and the extrusion process can be carried out continuously whereby the filament may be drawn, coated and spooled in a continuous operation, still, a conventional extrusion apparatus is not without problems. Conventional extruders include a centering die, a material reservoir and a sizing die. The centering die mechanically centers the filament in the sizing die, the sizing die determines the exterior dimensions of the coated filament and the thickness of the coat applied to the filament. The primary problem associated with extrusion apparatus is the wear on the centering die. Since the centering die is used to center the filament within the sizing die, the centering die must be finely adjusted to achieve a concentric coating and must be replaced periodically due to the wear resulting from the contact between the filament and the die. Centering dies tend to be expensive even when made of hardened steel; but because of the wear that occurs, diamond centering dies have been considered, but not widely used.

SUMMARY OF THE INVENTION

It is therefore a primary object of this invention to provide an improved magnet wire.

It is another object of this invention to provide an improved magnet wire which can be manufactured utilizing a process which does not require solutions of insulation material and therefore eliminates the need for solvents, pollution control equipment or to reclaimng solvents from the manufacturing process, lowers the cost of manufacturing at least proportionally to the cost of solvent, and conserves energy at least to the degree that energy is required to remove solvents from the insulation material.

It is also another object of this invention to provide an improved magnet wire which is not limited to the use of insulation material solutions or materials requiring curing after application.

It is another object of this invention to provide an improved magnet wire which does not require multiple coats to obtain the required concentricity and/or continuity.

It is another object of this invention to provide an improved magnet wire which can be manufactured by a technique in which a coating material can be applied to a continuously moving elongated filament to a desired thickness in a single pass.

It is another object of this invention to provide an improved magnet wire having a base insulation consisting of a single coat of material.

It is another object of this invention to provide an improved magnet wire by which can be manufactured at speeds which are limited only by filament pay-off and take-up devices.

It is another object of this invention to provide an improved magnet wire manufactured by a technique in which a coat of resin material may be applied to an elongated continuously moving filament to a desired single thickness in a single pass whereby the filament may be drawn or otherwise formed, coated and spooled in a continuous operation.

It is another object of this invention to provide an improved magnet wire manufactured by a technique which completely eliminates or substantially reduces the use of solvents thereby eliminating the cost of solvents and the need for pollution control equipment or to relcaim the solvents from the manufacturing process.

It is another object of this invention to provide an improved magnet wire manufactured by a technique which completely eliminates the need of highly complex machinery or centering dies wich experience high wear and must be replaced periodically.

It is another object of this invention to provide an improved magnet wire manufactured by a technique having all of the advantages of a conventional extrusion process but none of the disadvantages.

It is another object of this invention to provide a magnet wire having a coating superimposed thereon which is surprisingly continuous and concentric.

Finally, it is an object of this invention to provide a magnet wire having multiple coats of polyethylene terephthalate (PET) superimposed thereon.

In the broader aspects of the invention there is provided a novel magnet wire or other coated filament comprising an elongated filament with a surprisingly concentric and continuous coating superimposed thereupon. The coating may be applied to the desired thickness in a single pass.

The above mentioned and other features and objects of this invention and the manner of attaining them will become more apparent and the invention itself will be best understood by reference to the following description of the invention taken in conjunction with the accompanying drawings wherein:

DESCRIPTION OF A SPECIFIC EMBODIMENT

APPARATUS

Figure 1:
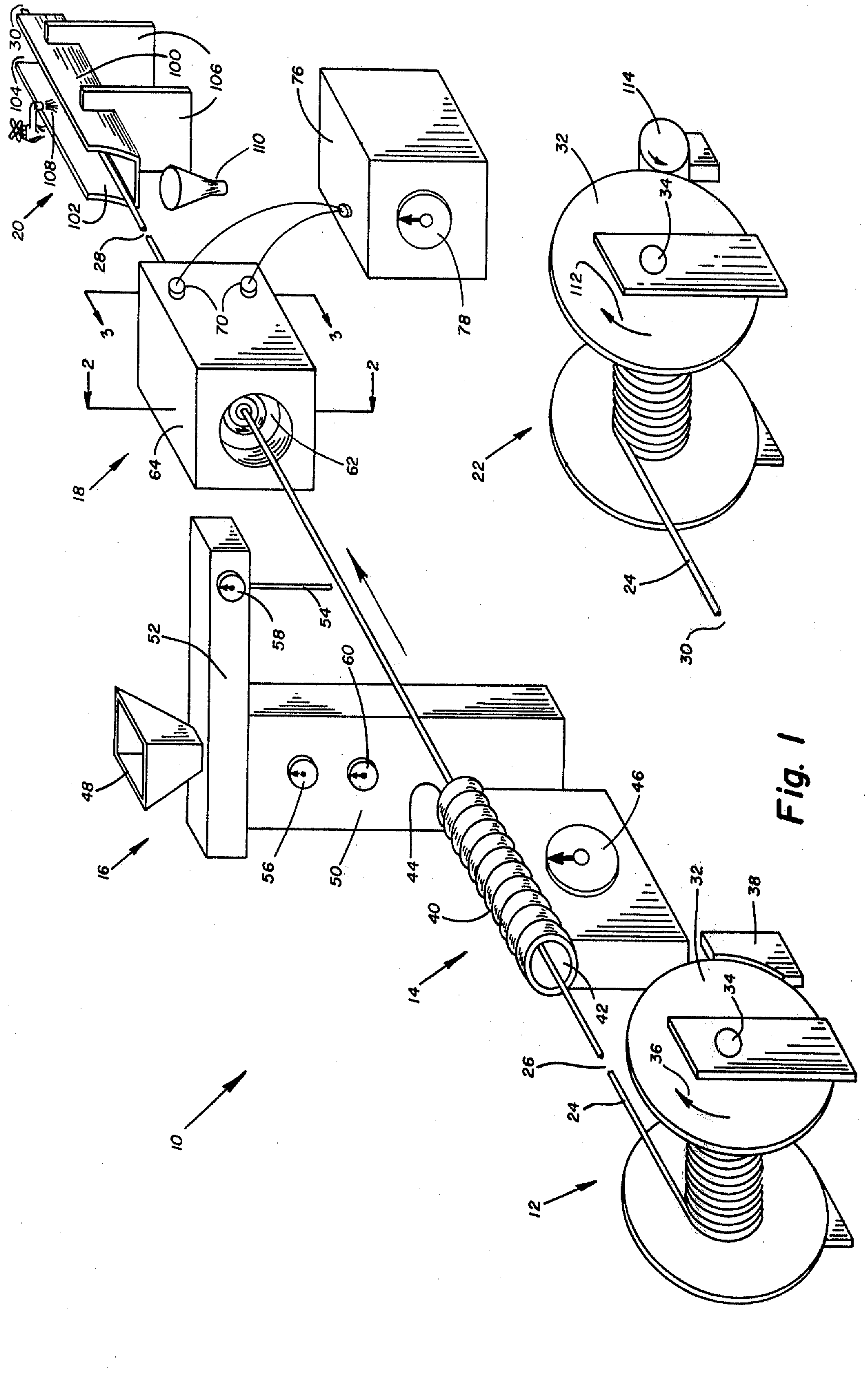
FIG. 1 is a perspective, fragmentary and diagramatic view of the apparatus of the invention.

Referring to the drawings, and specifically FIG. 1, the apparatus of the invention will be described. The apparatus 10 generally consists of a filament pay-out device 12, a filament heater 14, a coating material dispenser 16, a coating die 18, a hardener 20, and a filament take-up device 22. As shown in FIG. 1, the filament 24 is broken at 26, at 28, and at 30. At the filament break 26, when the apparatus of the invention is used to manufacture magnet wire, conventional wire drawing apparatus may be inserted. Thus, an oversized filament 24 may be reduced to the desired size by the drawing equipment prior to coating the filament. The filament heater 14 in a specific embodiment in which magnet wire is being manufactured by the apparatus of the invention may include an annealer whereby the effects of drawing the wire or stretching the wire may be eliminated. In other specific embodiments in which magnet wire is being manufactured by the apparatus of the invention, additional coating dies 18 and hardeners 20 may be inserted at 28 such that successive coats of different coating materials may be applied to the filament in a continuous manner.

The term "filament" is used herein for all strand materials. Filaments thus include both copper and aluminum conductors and insulated copper and aluminum conductors which prior to the application of a coat of material by the apparatus and method of the invention have been insulated with a base coat of insulating material, or other conventional insulating materials, and other strand materials desirably coated. While the specific embodiments herein described primarily relate to the manufacture of magnet wire, the apparatus of the invention is thought to have utility in coating all sorts of filaments other than conductors or insulated conductors in the production of magnet wire.

The term "flowable material" is used herein for the general class of coating materials applied by the method and apparatus of the invention. Again, while the specific embodiments herein described refer to meltable coating materials which can be hardened by cooling the material to ambient temperatures, other flowable coating materials are contemplated as being within the general class of materials which can be applied by the method and apparatus of the invention. These materials include materials which are initially flowable but later hardened by curing or thermosetting the material and also coating materials which may include up to about 5% by weight of solvent to render them flowable and later hardenable by driving the solvent from the material. In the manufacture of magnet wire, several different materials can be applied by the method and apparatus of the invention. These include polyamides such as Nylon, polyethylene terephthalates such as Dacron, polyethylenes, polycarbonates, polysulphones, epoxys, polyether imides, polyether ether ketone and polyesters.

The filament pay-out device 12 includes a spool 32 on which the filament 24 desirably coated is stored. The spool 32 is mounted on spindle 34 of the pay-out device 12 so as to freely rotate in the direction of the arrow 36. Operatively associated with the spool 32 is a brake 38 which restrains the rotation of the spool 32 as the filament 24 is being pulled therefrom by the take-up device 22 so as to prevent entanglements. In accordance with the method of the invention, it is highly possible that in a magnet wire manufacturing plant where conductors are being rolled, drawn or otherwise reduced in size to desirable conductor from ingots, the pay-out device 12 can be completely eliminated, since the remaining apparatus can be used to coat conductors continuously in a single pass as the conductor is supplied from such rolling and drawing apparatus. The reels 32 in this instance can be the reels upon which bare copper and aluminum conductors are now transported from the rolling and drawing operations to the magnet wire manufacturing plants. In all instances where the pay-out device 12 is eliminated and rolling and drawing operations are substituted therefore, an annealer 26 is an essential part of the apparatus in order to eliminate the effects of working the conductor during the rolling and drawing operations.

Filament heater 14 is an essential part of the apparatus of the invention to be used in the performance of the method of the invention. A filament heater may be used solely to raise the temperature of the filament prior to the application of the coating material or may be an annealer if hard bare wire is used or to further reduce the effects of the aforementioned rolling and drawing process. Thus, in a specific embodiment, the filament heater 14 may consist of an annealer, or may consist of a filament heater. In the specific filament heater embodiment 14 illustrated in FIG. 1, the filament heater comprises a resistance coil 40 being generally tubular in shape and having opposite open ends 42 and 44. The filament or conductor 24 is trained between the pay-out device 12 and the take-up device 22 through the coil 40. The filament heater 14 is also provided with a control 46 by which the temperature of the conductor 24 can be controlled. The filament heater 14 may also include a filament temperature measuring device such as a radiation pyrometer. Hereinafter in specific examples, the conductor temperatures reported herein are measured by such a device.

The flowable material applicator 16 has a chute 48 by which the material is supplied to the applicator, a material reservoir 50 in which the material may be stored, and a positive displacement pump 52 which dispenses the flowable material through a nozzle 54 directed onto the filament or conductor 24. When using melts or other temperature responsive flowable materials, reservoir 50 is provided with a heater and a control device 56 by which the temperature of the material in the reservoir can be controlled. An additional control device 58 is associated with the positive displacement pump 52 to control the amount of flowable material deposited upon the filament or conductor 24. In a specific embodiment, the fluid material applicator 16 may be an extrusion apparatus having the features above described. In those applications in which the flowable material is rendered more flowable by the use of a small portion of solvent, both the coating material and the solvent may be fed into the applicator via the chute 48 and the reservoir 50 may be provided with a mixing apparatus having associated therewith a separate control 60.

The coating die 18 is illustrated in FIGS. 1 through 4. The coating die 18 includes a die 62 mounted in a die box 64. Die box 64 has a lip 66 against which the die 62 is held by the filament 24 passing therethrough. Die box 64 is provided with heater bores 68 in which heaters 70 are positioned. In a specific embodiment, heaters 70 may be tubular Calrod heaters. Additionally, both the die block 64 and the die 62 is provided with a thermocouple bore 72 therein in which a thermocouple 74 (shown only in FIG. 4) may be positioned. Hereinafter, die temperatures are reported with regard to specific examples which are measured by the thermocouple 74. The heaters 70 are connected by suitable conductors to a heater 76. Heater 76 is provided with a control 78 whereby the temperature of the die 62 can be elevated above ambient temperature and controlled as desired.

Figure 2:
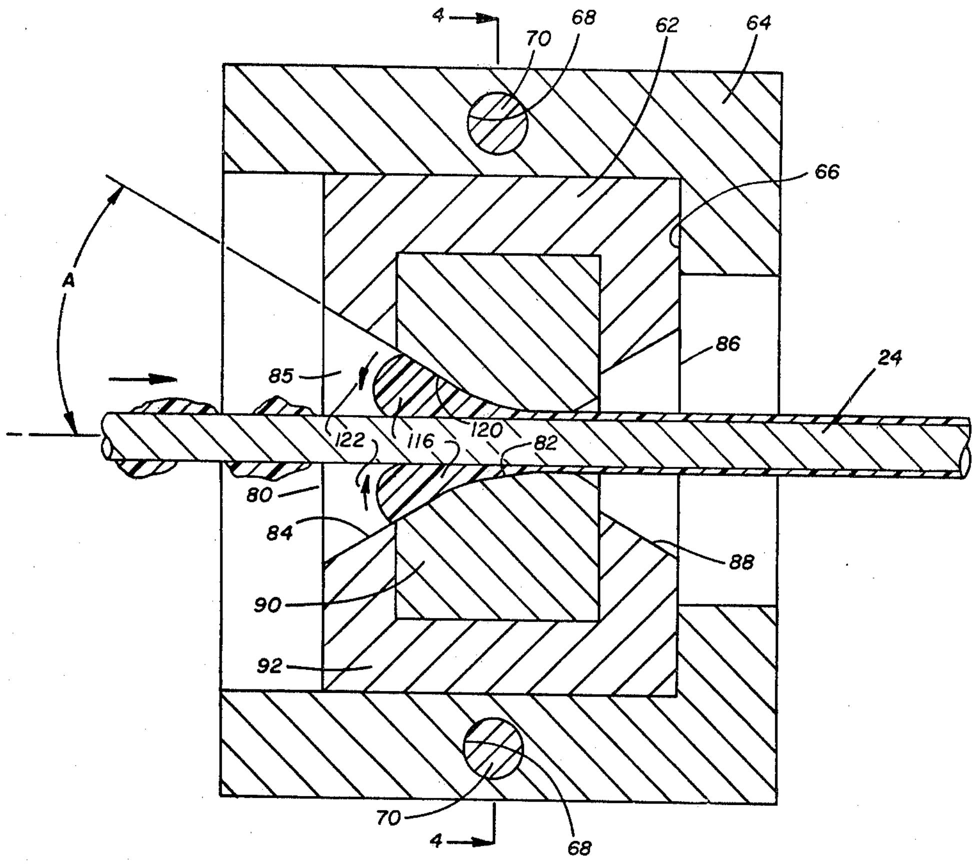
FIG. 2 is a cross-sectional view of the coating die of the invention, taken substantially along the Section Line 2—2 of FIG. 1.
Figure 3:
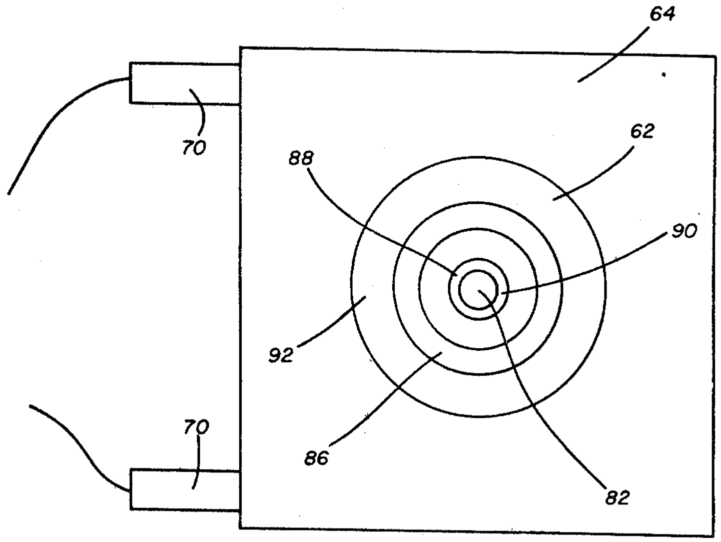
FIG. 3 is a front plan view of the coating die of the invention taken substantially along the Section line 3—3 of FIG. 1.
Figure 4:
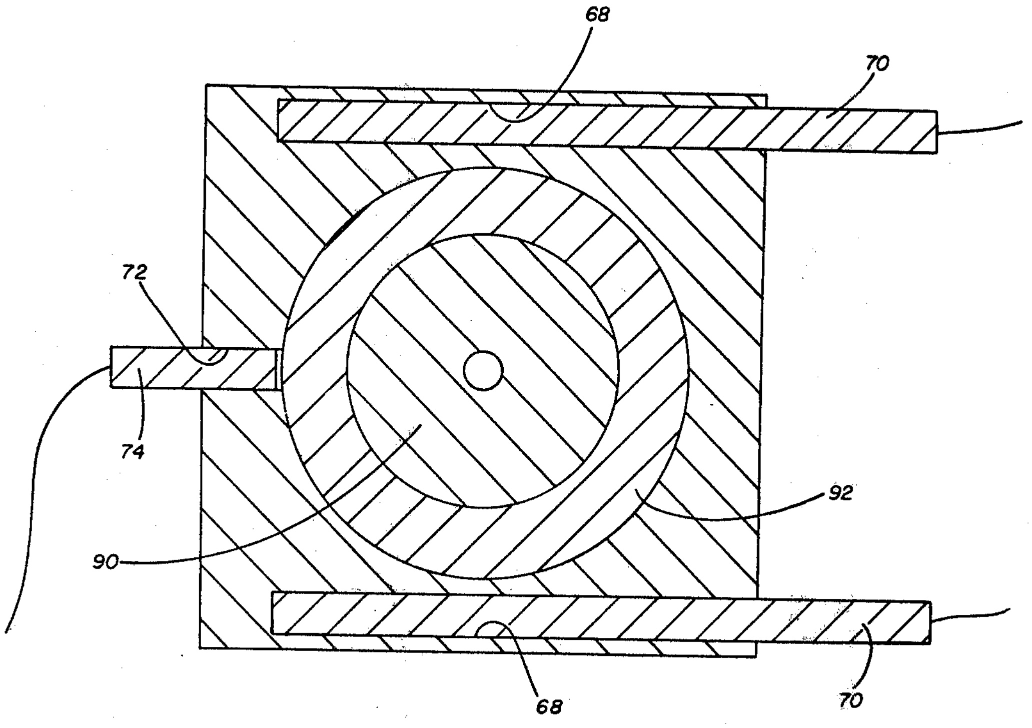
FIG. 4 is a cross-sectional view of the coating die of the invention taken substantially along the Section line 4—4 of FIG. 2.

Referring to FIG. 2, the die 62 is shown in crosssection to include an entrance opening 80, a throat 82 and a converging interior wall 84 which innerconnects the throat 82 and the entrance opening 80 of the die. Interior wall 84 defines a die cavity 85 in which a portion of the coating material collects, as will be mentioned hereinafter. The die also has an exit opening 86 and a diverging wall 88 interconnecting the throat 82 and the exit opening 86. In a specific embodiment, the converging wall 84 defines an angle A with conductor 24 of about 5 to about 40 degrees and throat 82 is tapered from converging wall 84 to diverging wall 88 so as to define an angle with the conductor 24 of about 1 to about 2 degrees. In a specific embodiment, the die 62 can be constructed as illustrated in a two piece fashion having a central piece 90 including the throat portion of harder and more wear resistant material than the exterior piece 92 which includes both the entrance opening 80 and the exit opening 86.

The hardener 20 functions to harden the coat of material on the filament or conductor 24 prior to spooling the coated filament or magnet wire by the take-up device 22. The hardener 20 as illustrated includes a trough 100 having opposite open ends 102 and 104. The trough is positioned such that the filament or conductor 24 can be trained to enter the open end 102, pass through the trough 100, and exit the open end 104 by the supports 106. Also as shown, the trough 100 is sloped downwardly toward the open end 102 and provided with a source of cooling fluid, such as water 108, adjacent open end 104 and a drain 110 adjacent open end 102. In many specific embodiments, a water quench utilizing the structure of the hardener 20 is desired. In other specific embodiments, a quench is not required and thus, the cooling fluid is not used. In these embodiments, either a flow of ambient air or refrigerated air (where available) is trained on the coated conductor or filament 24.

In specific embodiments in which multiple coats of different materials are being applied to the filament or conductor 24 by successive spaced apart coating dies 18, each of the coating dies 18 will have a material applicator 16 associated therewith and may have a hardener 20 associated therewith. The term "coating station" is used herein to refer to the assemblage of a material applicator 16, a coating die 18, and a hardener 20. In these embodiments, there will be a plurality of spaced apart coating stations between the pay-out device 12 and the take-up device 22.

The take-up device 22 in many respects is similar to the pay-out device 12. The take-up device 22 comprises a reel 32 on which the coated filament or conductor 24 is spooled for shipment. Thus, reels 32 may be the conventional spools on which coated filaments are conventionally shipped. Spools 32 are mounted for rotation on a spindle 34 so as to be driven in the direction of the arrow 112. Operatively connected to the spool 32 is a spool driver 114 which drives the spool 32 and thereby pulls the filament or conductor 24 from the spool or reel 32 of the pay-out device 12.

THE METHOD

The method of the invention will now be described. Reference to FIGS. 1 through 4 will be referred to and the terms "flowable material" and "filament" will be used as above defined. This description of the method of the invention will also specifically refer to the manufacture of magnet wire in a single pass whereby the filament or conductor is drawn or otherwise formed, coated and spooled in a continuous operation.

A continuous supply of the filament or conductor 24 is provided either by the pay-out device 12 as illustrated in FIG. 1 or from a rolling and drawing operation. If supplied from a rolling and drawing operation, the conductor 24 is always annealed to remove all effects of the rolling and drawing operation.

The filament or conductor 24 is then heated, if desired. Whether or not the filament 24 is heated is dependant upon the coating material utilized and the wire properties desired. Thus, the filament 24 may be heated by the heating device 14 to a temperature from about ambient temperature to about the decomposition temperature of the coating material. In most applications utilizing a melt or a heat-responsive flowable material in which the coat of material is desirably adhered to the filament or conductor 24, the filament or conductor is heated to a temperature from just below to about the melting point of the coating material. In most applications utilizing a melt or a heat-responsive flowable material in which the adhesion of the coat of material to the filament or conductor 24 is not required, the filament or conductor 24 is maintained from about ambient temperature to slightly above the ambient temperature.

The coating material is then applied to the filament. Those applications in which the coating material is a melt or a heat-responsive coating material, the coating material is stored in the reservoir 50 at a flowable temperature and is applied to the filament or conductor 24 at a flowable temperature. The flowable material is applied to the conductor or filament 24 in an amount which is in excess of that required to coat the conductor to the thickness required. However, the specific amount of the coating material applied to the filament or conductor 24 must be relatively accurately metered onto the filament 24 and the viscosity and/or the flow characteristics thereof must be carefully controlled for several reasons. First, the filament or conductor 24 is utilized in the method of the invention to carry the flowable material into the coating die 18. Thus, the viscosity and flow characteristics of the material applied to the filament or conductor 24 must be such that an amount in excess of the material required to coat the filament or conductor 24 as desired will remain on the filament or conductor 24 as it passes between the applicator 16 and the coating die 18. Second, the application of too great an excess will either result in the coated material dripping from the conductor or filament 24 between the applicator 16 and the coating die 18, resulting in a non-concentric coating. It is for these reasons, that the applicator 16 is provided with controls 56, 58, and 60.

The excess of coating material applied to the filament or conductor 24 functions to fill the die cavity 85 with coating material. FIG. 2 shows the appropriate amount of coating material 116 in the die cavity. The die cavity 85 is defined by the converging walls 84 of the die extending between the entrance opening 80 and the throat portion 82 thereof and the filament 24. The coating material 116 within the die cavity 85 functions to center the filament or conductor 24 within the throat portion 82 of the die. In order to do this, the properties of the coating material within the die cavity 85 must be controlled. In accordance with the method of the invention, such control is achieved by heating the die 18 by the heaters 70 and controlling the temperature of the die 18 by the control 78. When using coating materials which are not melts or temperature-responsive, the method of the invention contemplates the application of the coating material to the filament or conductor 24 having the appropriate flow characteristics necessary to appropriately center the filament or conductor 24 within the throat portion 82 of the die 18 as above described.

Coating materials of various types have been successfully applied in accordance with the method of the invention by the apparatus above-described at viscosities from about 5,000 cps to about 200,000 cps. In all cases, the coating material 116 within the die cavity 85 appropriately centers the filament or conductor 24 within the throat portion 82 of the die 18 so long as the coating material 116 forms an annular or toroidal support 120 within the die cavity 85 adjacent to the throat portion 82 and rotates in the direction of the arrows 122 inwardly or in other words from the converging wall 84 toward the conductor or filament 24. When using the coating die 18 as illustrated in FIG. 1, the formation of the annular support 120 and the rotation thereof in the direction of the arrows 122 can be visually seen from the front of the coating die 18. In all instances known to the applicants wherein the annular support 120 forms and rotates, filaments or conductors 24 are coated by the method and apparatus of the invention with a surprisingly concentric and continuous coat of coating material thereon. Conversely, in all instances in which the annular support 120 is not formed or rotating in the direction of the arrows 122, a non-concentric and discontinuous coating is applied to the filament or conductor 24. Thus, the formation of the annular support 120 of coating material within the die cavity 85 and the rotation thereof is essential to the method of the invention.

The throat portion 82 of the die 18 wipes the excess of the coating material from the filament or conductor 24 as it leaves the die cavity 85. The excess of coating material supplies the coating material necessary for the formation of the annular filament support 120 above-described. The size of the throat portion 82 varies in accordance with the size of the filament or conductor 24 and the desired thickness of the coat to be applied thereto. The method of the invention has been successfully used with filaments ranging from about 30 AWG gauge to about 154" rod. Conductors of rectangular cross-sections and of other cross-sections can also be coated by the method and apparatus of the invention so long as the throat portion 82 of the die 18 can be provided in geometrically similar shapes. Coatings from about ½ mil to about 16 mils thick can be applied by the method of the invention. Depending upon the flow properties of the coating material, the throat portion 82 will have a diameter about 2 mils larger than the desired diameter of the coated filament 24 of magnet wire.

The coated filament or conductor 24 is then passed through the hardener 20 in order to harden the coating material thereon. While the structure of the hardener 20 and the function thereof has been described hereinabove, it should be emphasized here that the operation of the hardener 20 depends greatly upon the coating material used. Either a water quench or an air quench may be utilized. Additionally, in those flowable materials in which small amounts of solvent are used to aid in the properties of the flowable material, the hardener 20 may take the form of a filament heater 14, or a conventional curing oven (not shown). In all cases, the type of hardener 20 utilized and the temperature of the cooling liquid, air or other fluid utilized will depend both on the coating material and the speed at which the coated filament passes through the hardener 20.

The operation and function of the take-up device 22 was described hereinabove. However, the speed at which the take-up device 22 was driven was not mentioned. The driver 114 is not limited in any way by the method of the invention. The speed at which the driver 114 drives the spool 32 of the take-up device 22, in the embodiment illustrated in FIG. 1 utilizing both pay-out 12 and take-up 22 devices, is solely limited by the pay-out 12 and take-up 22 devices themselves when applying any of the coating materials mentioned herein. When the pay-out device 12 is eliminated and conventional rolling and drawing operations are substituted therefore, the speed at which the take-up device 22 is driven by the driver 114 is solely limited by the take-up device 22, itself.

Specific examples in which conductors of various sizes have been coated with coating material such as above mentioned in accordance with the method of this invention are tabulated in Table 1. Table 1 solely relates to the production of magnet wire. Table 1 tabulates all of the essential properties of the coating material and the conductor, all of the essential process conditions, and all of the essential physical and electrical properties of the magnet wire produced in this specific example in accordance with the method of the invention utilizing the apparatus described hereinabove.

THE MAGNET WIRE

The magnet wire produced by the apparatus of the invention in accordance with the method of the invention meets all of the requirements of magnet wire made by other existing commercial processes. Table 1 tabulates the physical and electrical properties of various magnet wires manufactured in accordance with the method of the invention utilizing the apparatus of the invention. A surprising characteristic of all magnet wires made in accordance with the method of the invention utilizing the apparatus of the invention is the concentricity of the coating applied to the conductor and the continuity thereof. Both the concentricity and continuity are a surprising result when compared to magnet wires made by other existing commercial processes, without regard to the means by which the conductor or filament 24 is centered within the coating die 18 in accordance with the method of the invention. Magnet wire produced by the application of coatings from solution, periodically result in non-concentric coatings and non-continuous coatings. In fact, the continuity of coatings applied from solution is such that reliance upon a single coat of the magnet wire insulation is unheard of; and for this reason and others, multiple coatings are used as above-mentioned. Furthermore, coatings or polyethylene terephthalate such as Dacron have not been successfully applied in desired thicknesses from solution, since multiple coats of Dacron do not coat upon each other. Thus, by the apparatus and method of the invention, for the first time, coatings of Dacron in a desired thickness can be applied whereby magnet wire having solely Dacron insulation can be for the first time manufactured and sold commercially. Also, for the first time magnet wire having a single coat is a commercial reality due to the concentricity and thickness of the coatings that can be applied by the apparatus and method of the invention.

The invention provides an improved method and apparatus for applying coatings of a flowable resin material concentrically to a moving elongated filament in a single pass, and an improved magnet wire. In the manufacture of magnet wire, the method and apparatus of the invention is an improvement over conventional methods of manufacturing magnet wire. By the invention, insulation can be applied to a continuously moving elongated conductor, concentrically, to a desired thickness in a single pass. The speed is limited only by the pay-off and take-up devices. The conductor can be drawn or otherwise formed, coated, and spooled in a continuous operation which completely eliminates or substantially reduces the use of solvents, thereby eliminating the cost of solvents and the need for pollution control equipment. The apparatus of the invention completely eliminates the need for highly complex machinery or dies which experience high wear and must be replaced periodically. The improved method and apparatus of the invention has all of the advantages of a conventional extrusion process but none of the disadvantages.

While there have been described above the principles of this invention in connection with specific apparatus, it is to be clearly understood that this description is made only by way of example and not as a limitation to the scope of the invention.

TABLE I

PROCESS CONDITIONS AND PHYSICAL AND ELECTRICAL PROPERTIES OF RESULTING MAGNET WIRE

| | | | | | | |
|---|---|---|---|---|---|---|
| COATING MATERIAL | | | | | | |
| Type of Material | Polyamide (6,6) | Polyethylene Terephthalate | Polyethylene Terephthalate | Polyethylene | Polysulfone | Polyethylene Terephthalate |
| Approximate melting temperature | 248° C. | 256° C. | 256° C. | 122–136° C. | 235–256° C. | 256° C. |
| CONDUCTOR | | | | | | |
| Material | Copper | Copper | Aluminum | Copper | Copper | Copper |
| AWG Gauge | 18 | 18 | 18 | 18 | 18 | 18 |
| Bare or Coated | Bare | Bare | Bare | Bare | Bare | Bare |
| PROCESS CONDITIONS | | | | | | |

TABLE I-continued

PROCESS CONDITIONS AND PHYSICAL AND ELECTRICAL PROPERTIES OF RESULTING MAGNET WIRE

| | | | | | | |
|---|---|---|---|---|---|---|
| Approximate coating material reservoir temperature, | 550° F. | 580° F. | 580° F. | 500° F. | 670° F. | 580° F. |
| Approximate coating material viscosity, cps | — | 7,200 | 7,200 | — | 200,000+ | 7,200 |
| Die throat size, mils | 44.5 | 44.5 | 44.5 | 44.5 | 45.3 | 45.3 |
| Approximate die temperature, | 550° F. | 600° F. | 600° F. | 550° F. | 700° F. | 600° F. |
| Approximate conductor temperature, | 450–550° F. | 350–450° F. | 450–550° F. | 350–450° F. | 475–575° F. | 375–475° F. |
| Annealer | 7.5 volts | 6.0 volts | 8.8 volts | 5.5 volts | 7.5 volts | 17 volts |
| Hardener temperature, | 65° F. | 65° F. | 60° F. | 65° F. | 65° F. | 65° F. |
| Conductor speed, fpm | 200 | 100 | 100 | 100 | 100 | 400 |
| PHYSICAL PROPERTIES | | | | | | |
| (NEMA reference) | | | | | | |
| Build, mils (Par. 1.1.1, part 3) | 3.3 | 3.3 | 3.9 | 2.8 | 3.4 | 3.5 |
| Smoothness | Good | Good | Good | Good | Fair | Good |
| Elongation (Par. 3.1.1, part 3) | 27% | 34% | 27% | 30% | 30% | 30% |
| Flexibility IX (Par. 2.1.1, part 3) | OK | OK | OK | OK | OK | OK |
| Snap | OK | OK | OK | OK | OK | OK |
| Flexibility after snap | OK | OK | OK | OK | OK | OK |
| Slit twist | 163 | 208 | 226 | 248 | .38 | 210 |
| Concentricity | 1:1.5 | 1:1.2 | 1:1.3 | 1:1.2 | 1:1.5 | 1:1.5 |
| ELECTRICAL PROPERTIES | | | | | | |
| (NEMA reference) | | | | | | |
| Dielectric breakdown, volts | 5,740 | 8,600 | 11,130 | 6.950 | 8,230 | 6,660 |
| Continuity C3000V, faults/1000 ft. | (2000V) 70 faults | (2000V) 30 faults | (3000V) 70 faults | (2000V) 50 faults | (2000V) 160 faults | (2000V) 10 faults |

What is claimed is:

1. A magnet wire or other coated filament comprising: an elongated filament and an essentially concentric and continuous coating superimposed on said filament, said coating being chosen from the group of materials consisting of polyamides, polycarbonates, polysulfones, epoxys, polyether imides, polyether ether ketones and polyesters, said coating being applied to a desired thickness in a single pass, said thickness meeting the requirements of ANSI/NEMA Standards Publication No. MW1000-1977.

2. The magnet wire of claim 1 wherein said coating is of a polyethylene terephthalate material.

3. The magnet wire of claim 2 further comprising at least one additional essentially concentric and continuous coating of polyethylene terephthalate material superimposed on said filament, there being a plurality of essentially concentric and continuous coatings of polyethylene terephthalate material superimposed on said filament.

4. The magnet wire of claim 1 further comprising at least one additional essentially concentric and continuous coating superimposed on said filament, there being a plurality of essentially concentric and continuous coatings superimposed on said filament.

5. The magnet wire of claim 4 wherein said coatings are of the same material.

6. The magnet wire of claim 4 wherein said coatings are of different materials.

7. The magnet wire of claim 1 wherein said coating is of a Nylon 6/6 polyamide material.

* * * * *